July 19, 1966 S. T. WILK 3,261,547

METHOD OF PERFORMING ZERO CONTROL IN ADDING MACHINES HAVING A BALANCING REGISTER AND APPARATUS THEREFOR

Filed April 12, 1965 2 Sheets-Sheet 1

Soen Tore Wilk, Inventor

By Wenderoth, Lind & Ponack, Attorneys

July 19, 1966 S. T. WILK 3,261,547
METHOD OF PERFORMING ZERO CONTROL IN ADDING MACHINES HAVING A BALANCING REGISTER AND APPARATUS THEREFOR
Filed April 12, 1965 2 Sheets-Sheet 2
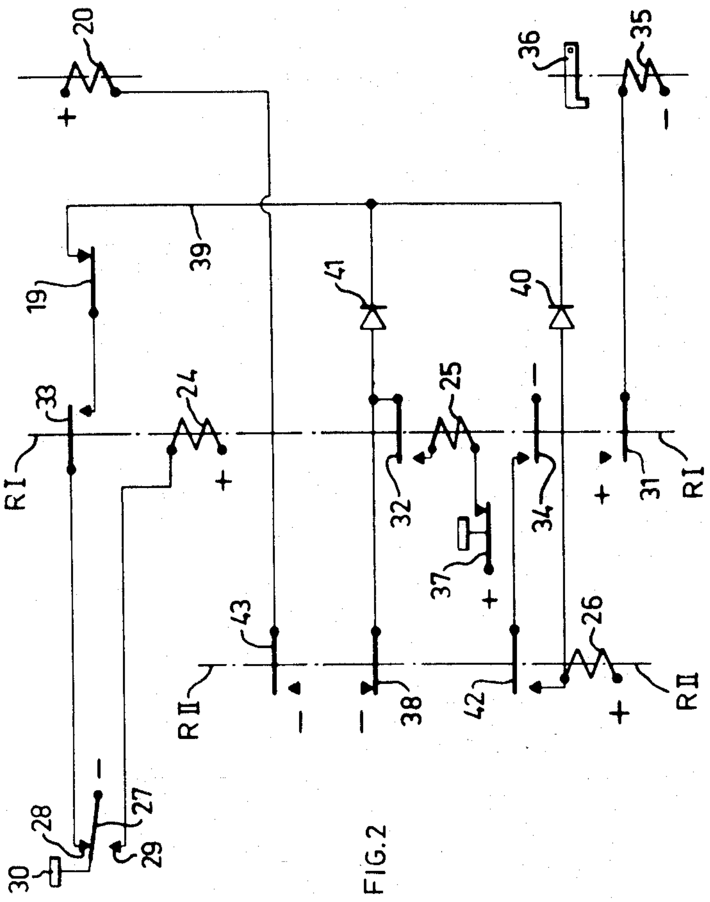
Sven Tore Wilk,
Inventor
By Wenderoth, Lind & Ponack,
Attorneys 3,261,547
Patented July 19, 1966

1

2

3,261,547

METHOD OF PERFORMING ZERO CONTROL IN ADDING MACHINES HAVING A BALANCING REGISTER AND APPARATUS THEREFOR

Sven Tore Wilk, Malmo, Sweden, assignor to Aktiebolaget Addo, Malmo, Sweden, a corporation of Sweden Filed Apr. 12, 1965, Ser. No. 447,178
Claims priority, application Sweden, Apr. 15, 1964, 4,619/64
6 Claims. (Cl. 235—1)

In adding machines, particularly in adding machines arranged for bookkeeping, it is often desirable to perform so-called zero control which serves to check whether the result of a calculation the correct result of which shall be zero, actually bcomes zero. Zero control is utilized particularly for providing certainty that numbers are correctly entered by the operator on the keyboard of the machine. The operator thus sets up the number or numbers on the machine keyboard a first time, introducing them with their normal sign, for example additively, into a balancing register of the machine whereupon he sets up the number or numbers a second time on the keyboard, but introducing them this time with the opposite sign, for example subtractively, into the balancing register. If the balancing register initially was at zero and the operator did not happen to set up the number or any of the numbers wrongly any of the two times he sets up the number or numbers on the keyboard, the balancing register after completion of the calculation described will be at zero. Checking of the result of the zero control has hitherto been effected by visual reading of the register proper or by having the register make a print on a paper in the machine after a totalizing operation.

It has been found desirable, however, to dispense with the visual reading of the register result at zero control and to obtain instead, when errors have been made, an error indication, for instance lighting of an error indicating lamp or preferably blocking of the machine to further operating cycles.

This desire is satisfied by the present invention which relates to a method of performing zero control in adding machines having a balancing register including carry transmitting means which operate according to the principle of the "fugitive one" and which are adjustable between an inoperative position and an operative position. The characteristic features of the method outlined above are that after a calculation the result of which shall be zero as registered in the balancing register, there is enabled an error signalling means, preferably a means blocking the adding machine to further operating cycles, by electric circuit means while establishing a first holding circuit for holding the error signalling means in the operative state whereupon the position of the carry transmitting means of the highest register order is sensed in such a way, that if the last mentioned carry transmitting means occupies inoperative position, a second holding circuit for holding the error signalling means in the operative state is established, that the first holding circuit is opened and that the carry transmitting means of the lowest register order are adjusted into operative position by electric circuit means so that the error signalling means is disabled, preferably the blocking of the machine by the blocking means is cancelled, on the condition that the register after the calculation actually is at zero, by opening of said second holding circuit when the carry transmitting means of the highest order on said condition is adjusted into its operative position by reason of said adjustment of the carry transmitting means of the lowest order into operative position.

The invention also relates to an apparatus for effecting the above described method, and the characteristic features of the apparatus are that a blocking relay can be energized by switch means actuatable after a calculation the result of which shall be zero as registered by the balancing register, that the blocking relay includes a first make contact by which an error signalling means can be enabled, preferably a blocking means can be energized which is adapted when energized to block the adding machine to further operating cycles, that the blocking relay includes a second make contact which is adapted to establish a first holding circuit for the blocking relay via a break contact in a testing relay, that a switch can be so operated by the carry transmitting means of the highest register order that the switch is closed in the inoperative position of said carry transmitting means and is open in the operative position thereof, said switch being adapted in closed state to establish a second holding circuit for the blocking relay via a third make contact in the blocking relay, and an energizing circuit for the testing relay via said third make contact (or a particular make contact) in the blocking relay, and that the testing relay incorporates a make contact for closing a circuit through an electromagnet which is adapted when energized to adjust the carry transmitting means of the lowest register order from the inoperative position to the operative position.

These and further features of the invention will become apparent from the following description, reference being had to the accompanying drawings illustrating an embodiment of the apparatus according to the invention. In the drawings:

FIG. 2 is an electric wiring diagram.

Figure 1:
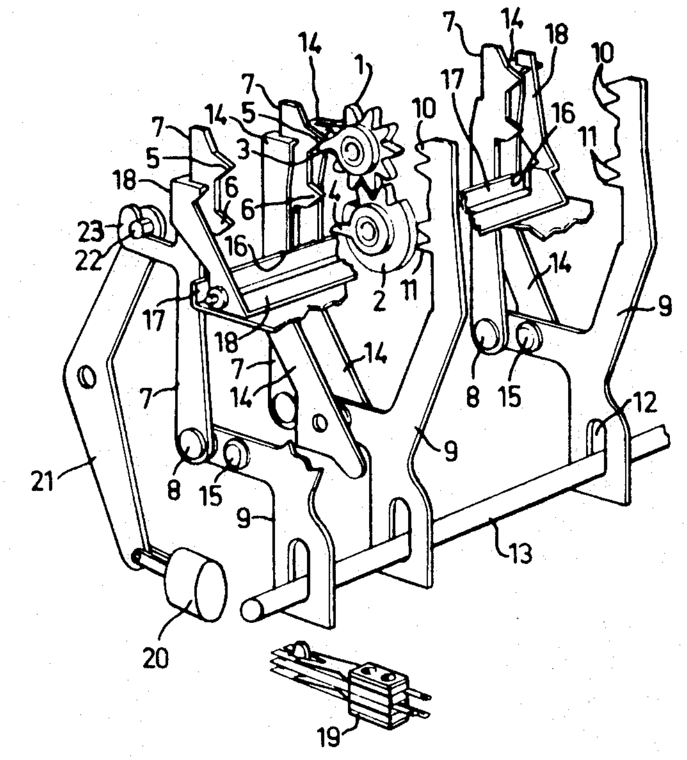
FIG. 1 is a diagrammatic perspective view of some parts, essential to the understanding of the invention, of a balancing register of a previously known type, as well as some parts coacting with carry transmitting means in the register and incorporated in the embodiment chosen as an example of the invention.

Though not essential to the invention, it is supposed that the balancing register illustrated in FIG. 1 and incorporated in the adding machine, for example a bookkeeping machine, for the sake of simplicity, is purely decadic. Thus there is in each order or decade of the register two permanently meshing register wheels 1 and 2 each having ten teeth. FIG. 1 shows for greater clarity but one wheel set 1, 2 of this type. All wheels 1 are freely rotatably mounted on a common shaft (not shown). and all wheels 2 are mounted in the same way on another shaft (not shown). These shafts are mounted in a frame (not shown) which is movable in the customary way so that either the wheels 1 or the wheels 2 can be moved into engagement with racks (not shown) for introducing numbers set up on the keyboard of the adding machine into the register. When the wheels 1 engage the racks the number is additively introduced, while it is subtractively introduced when the wheels 2 engage the racks.

The register is equipped with carry transmitting means operating according to the principle of the "fugitive one." For actuation of the carry transmitting means such register wheel 1, 2 in addition to its gear rim comprising ten teeth has a single carry transmitting tooth 3 and 4, respectively. In each decade of the register the two teeth 3, 4 coact each with one nose 5 and 6, respectively, on a trip-releasing catch 7 which is pivoted at 8 to a carry introducing means 9 in the associated decade. Each introducing means 9 has two teeth 10 which can be caused to engage the register wheel 1 arranged in the associated decade, and two teeth 11 which can be caused to engage the register wheel 2 arranged in the associated decade. Each introducing means 9 has a slot 12 through which extends a rod 13 common to the means 9. Springs (not shown) tend to move the introducing means 9 downwards as seen in FIG. 1 into an operative position so that the slots 12 will have their upper ends applied against the rod 13. In the reset or inoperative position (shown in FIG. 1) of the introducing means 9 said means are, however, kept in a raised position in which the lower ends of the slots 12 accommodate the rod 13 with the aid of holding pawls 14 which are mounted by means of a pin 15 on the respective introducing means 9 and have a shoulder 16 which in the reset position engages an edge of a shelf 17 on the frame of the register to prevent the springs from lowering the introducing means 9. In each decade with the exception of the lowermost (to the far right in FIG. 1) the holding pawl 14 engages the trip-releasing catch 7 in the next lower decade. In the lowermost decade the holding pawl 14 engages one arm of a U-shaped member 18 pivotally mounted to the frame of the register, the other arm of said U-shaped member engaging the strip-releasing catch 7 of the highest decade (to the far left in FIG. 1). Springs (not shown) tend to hold the pawls 14 applied against the shelf 17.

Registers of the design described and of similar designs are generally known, and it will therefore be superfluous to describe the function of the carry transmitting means at carry transmission during normal calculations, particularly as this is of no interest to the present invention. On the other hand there will be described a property in such registers, which is exploited in the present invention. In FIG. 1 the register is shown occupying reset position with all introducing means 9 in inoperative or raised position and with the subtraction register wheels 2 in zero position, while the addition register wheels 1 occupy the position for digit 9 and have their transmission teeth 3 situated adjacent to and beneath the noses 5 of the trip-releasing catches 7. This "negative" zero state of the register can be checked by first establishing that the carry transmitting means and more particularly the introducing means 9 in the highest decade of the register (to the far left in FIG. 1) occupies raised or inoperative position, and then moving the holding pawl 14 of the lowest decade or unit decade out of engagement with the shelf 17 so that the introducing means 9 of the unit decade are lowered into the operative position. If the addition register wheel of the unit decade, as was presupposed, actually occupies the position for digit 9 the tooth 3 of the addition register wheel 1 of the unit decade will during lowering of the introducing means 9 and thus the trip-releasing catch 7 in the unit decade move the catch 7 counter-clockwise as seen in FIG. 1 so that said catch 7 will swing the holding pawl 14 mounted on the introducing means 9 of the unit decade out of engagement with the shelf 17 whereby the introducing means 9 of the tens decade is lowered into operative position. The cycle described will be repeated decade by decade as long as the addition register wheels 1 of the decades occupy the position for digit 9 and the introducing means initially occupy the inoperative state, as was presupposed, so that finally also the trip-releasing catch 7 of the next highest decade swings the holding pawl 14 of the highest decade out of engagement with the shelf 17, which will lower the introducing means 9 of the highest decade into operative position. If the addition register wheel 1 of any decade is not a digit 9 so that the tooth 3 of this register wheel cannot move the associated trip-releasing catch 7 counter-clockwise as viewed in FIG. 1, i.e. if the subtraction wheels do not all occupy the position for zero, or if the introducing means 9 of any decade occupies operative position already from the beginning, the releasing cycle described for the introducing means 9 in series will be interrupted in the decade in question so that the swinging of the holding pawl 14 of the lowest decade away from the shelf 17 does not result in a lowering of the introducing means of the highest decade. Should the introducing means 9 of the highest decade initially occupy raised or inoperative position and be lowered into operative position after release of the holding pawl 14 of the lowest decade this indicates that the register occupies a zero state. In the described case shown in FIG. 1 it is the "negative" zero state but the counter also has a "positive" zero state, for which, however, the described zero control conditions are similar. The only difference is that the register wheels 1 in the "positive" zero state of the register are swung away from the catches 7 and occupy the position for zero while register wheels 2 occupy the position for digit 9 and are swung into position adjacent the catches 7, the teeth 4 of the wheels 2 being situated adjacent to and beneath the noses 6 of the catches 7 to move said catches aside at the lowering of the introducing means 9.

In order that the property, described above, of balancing registers including carry transmitting means functioning according to the principle of "fugitive one" may be exploited for mechanical zero control use is made in the embodiment shown in the drawings of a switch 19 for sensing the position of the introducing means 9 of the highest decade, and of an electromagnet 20 for maving the holding pawl 14 of the lowest decade aside. The switch 19 is closed when the introducing means 9 of the highest decade occupies the raised or inoperative state but is opened by the introducing means 9 when said means is lowered into its operative position. In the embodiment chosen by way of example the electromagnet 20 is allowed for structural reasons to actuate the holding pawl 14 of the lowest decade indirectly in the following way. The magnet 20 is connected to one arm of a two-armed lever 21 which is mounted on the frame of the register and the other arm of which carries a pin 22 which engages a hook 23 on the trip-releasing catch 7 of the highest decade. When the magnet 20 is energized the lever 21 is swung counter-clockwise as seen in FIG. 1 so that the trip-releasing catch 7 is swung in the same direction and swings the U-shaped member 18 which in turn swings the holding pawl 14 of the lowest decade out of engagement with the shelf 17 so that the introducing means 9 of the lowest decade is lowered into operative position.

In the embodiment shown by way of example the switch 19 and the electromagnet 20 are connected in a circuit arrangement of the type diagrammatically shown in FIG. 2. Among the circuit means in FIG. 2 there may be mentioned a blocking relay RI having two control coils namely an energization coil 24 and a holding coil 25, and a testing relay RII having an energizing coil 26. There is also provided switch means in the form of a make-and-break contact the movable contact means 27 of which is operable in the embodiment shown by means of a key 30 although it could also be automatically controllable by means of program control means in the adding machine, particularly if the latter is a bookkeeping machine. The movable contact 27 of the switch means 27–29, which contact in the non-actuated state engages the fixed contact 28 is connected to the negative pole of a source of current. Upon actuation of the switch means the movable contact 27 is engaged with the fixed contact 29 which is connected with one terminal of the energization coil 24 of the blocking relay RI, the other terminal of said coil being connected to the positive pole of the source of current, so that the blocking relay RI is energized upon actuation of the key 30.

A first make contact 31 in the blocking relay RI is connected to the positive pole of the source of current and one terminal of an electromagnet 35 the other terminal of which is connected to the negative pole of the current source. When the blocking relay RI is deenergized the electromagnet 35 consequently carries no current, but it carries current as long as the blocking relay is energized. The electromagnet 35 is adapted upon energization to swing a pawl 36 in the adding machine to a position in which it blocks the adding machine in a known manner to further operating cycles, for example the pawl locks the keyboard of the machine against depression of keys or the pawl locks the drive clutch of the machine. The magnet 35 and the pawl 36 thus constitute a blocking means which after energization of the blocking relay RI prevent a further utilization of the adding machine for calculations until the blocking relay has again been deenergized.

One terminal of the holding coil 25 of the blocking relay RI is connected to the positive pole of the current source over a break contact 37, which is for example key operated, while the other terminal of the holding coil is connected to a second make contact 32 in the blocking relay RI. This make contact 32 is connected to a break contact 38 in the testing relay RII, which contact is connected to the negative pole of the current source so that a first holding circuit for the relay RI is established.

At third make contact 33 in the blocking relay RI is connected on one hand to the fixed contact 28 in the switch means 27–29 and on the other hand to the switch 19 which senses the position of the introducing means 9 in the highest decade of the register and which via a line 39 and a diode 40 is connected to one terminal of the control coil 26 of the testing relay RII, the other terminal of said coil being connected to the positive pole of the current source. The abovementioned second make contact 32 of blocking relay RI is also connected to the line 39 over a diode 41 so as to establish, under the conditions described in the following, a second holding circuit for the relay RI. The diodes 40 and 41 can be dispensed with if the make contact 32 and the coil 26 are connected each by means of a line to one break contact in the switch 19 and one make contact in the blocking relay RI corresponding to the contact 33, said make contacts being connected in common to the fixed contact means 28.

A fourth make contact 34 in the blocking relay RI is connected to the negative pole of the current source and to a first make contact 42 in the testing relay RII, which contact is connected to the same terminal of the control coil 26 as the diode 40, to establish a holding circuit so that upon energization of the testing relay RII said relay is held energized as long as the blocking relay RI is also energized. The interconnected make contacts 34, 42 can be dispensed with if the relay RII is one of delayed deenergization so that it is sure not to be deenergized until the relay RI has been deenergized.

The testing relay RII finally also has a second make contact 43 which is connected to the negative pole of the current source and to one terminal of the aforesaid electromagnet 20 the other terminal of which is connected to the positive pole of the current source so that the electromagnet 20 swings aside the holding pawl 14 of the lowest decade from the shelf 17 (FIG. 1) for lowering the introducing means 9 of the lowest decade when the testing relay RII is energized.

In the state of rest the circuit means occupy the position shown in FIG. 2. Should zero control be performed the key 30 is depressed so that the movable contact means 27 of the make-and-break contact 27–29 engages the fixed contact means 29. This will energize the blocking relay RI in that the energization coil 24 is supplied with current from the positive pole of the current source via the coil 24 and the contact means 27 and 29 to the negative pole of the current source. The blocking relay RI upon energization will be held via the abovementioned first holding circuit in that the holding coil 25 is supplied with current from the positive pole of the current source via the key-operated break contact 37, the coil 25, the closed make contact 32 in the energized blocking relay RI and the break contact 38 in the testing relay RII which so far is still deenergized. The energization of the blocking relay RI will also close the make contact 31 so that the adding machine is blocked to further operating cycles in that the electromagnet 35 is supplied with current from the positive pole of the current source via the closed make contact 31 and the magnet 35 to the negative pole of the current source and actuates the pawl 36.

Nothing further happens until the key 30 is again released so that the movable contact means 27 leaves the fixed contact means 29 for interrupting the current through the energization coil 24 and engages the fixed contact means 28. Then the first step of the zero control described in its principle in the foregoing is performed, namely establishing whether the introducing means 9 of the highest decade occupies inoperative (raised) position or operative (lowered) position. If the introducing means 9 of the highest decade occupies active position so that the result of the calculation effected in the register is not zero, the switch 19 is open whereby the engagement of the contact means 27 and 28 does not result in any action, but the machine will remain blocked by the pawl 36 as an indication of the fact that the zero control has discovered an error in the calculation which should have given zero as a result. Should, however, the introducing means 9 of the highest decade occupy inoperative position so that the switch 19 is closed, the engagement of the contact means 27 and 28 at the release of the key 30 involves energization of the testing relay RII in that the control coil 26 of the relay RII is supplied with current from the positive pole of the current source via the coil 26, the diode 40, the line 39, the closed switch 19, the closed make contact 33 in the energized blocking relay RI and contact means 28 and 27 to the negative pole of the current source. Besides the aforesaid second holding circuit for the blocking relay RI is established from the positive pole of the current source via the key-operated break contact 37, the holding coil 25 of the relay RI, the closed make contact 32, the diode 41, the line 39, the closed switch 19, the closed make contact 33 and the contact means 28 and 27 to the negative pole of the current source. The testing relay RII obtains holding effect by a circuit being established from the positive pole of the current source via the coil 26 and the closed make contacts 42 and 34 to the negative pole of the current source.

At the energization of the testing relay RII the second step of the zero control is effected. The energization of the relay RII involves on one hand that the aforesaid first holding circuit for the blocking relay RI is broken by opening of the break contact 38 so that the relay RI is now held only by the aforesaid second holding circuit via the closed switch 19, and on the other hand that the make contact 43 is closed so that the electromagnet 20 is supplied with current from the positive pole of the current source via the electromagnet 20 and the make contact 43 to the negative pole of the current source. Upon supply of current to the electromagnet 20 the introducing means 9 of the lowest decade is released as already mentioned and lowered into operative position. If the register actually is in "additive" or "subtractive" zero state the lowering of the introducing means 9 of the lowest decade will result in that the introducing means 9 of all the other decades are lowered in series. At the lowering of the introducing means 9 of the highest decade the switch 19 is opened so that the current supply over the switch 19 and the diode 40 to the control coil 26 of the testing relay RII is interrupted and besides the aforesaid second holding circuit of the blocking relay RI is opened whereby the blocking relay RI is deenergized and breaks the holding circuit for the testing relay RII by opening of the make contact 34 so that the testing relay RII is deenergized and the current supply to the electromagnet 20 is interrupted by opening of the make contact 43. At the deenergization of the blocking relay RI all make contacts in this relay are opened so that the circuit means again occupy the initial position shown in FIG. 2. At the opening of the make contact 31 in the blocking relay RI the current supply to the electromagnet 35 is broken so that the blocking of the adding machine by the pawl 36 ceases as an indication of the fact that the zero control has shown the correct result of the calculation effected in the register, and the adding machine can therefore be allowed to continue with the next calculation.

Should the register, however, not be in "additive" or "subtractive" zero state the introducing means 9 of the highest decade will not in the second step of the zero control open the switch 19 in the manner described, and as a consequence the relays RI and RII remain energized so that the pawl 36 is retained in the position blocking the adding machine.

Should the zero control during the first or second step lead to the indication of an error so that the machine permanently remains in blocked condition to direct the operator's attention to the error, the operator is able to cancel the blocking by actuating the key-operated break contact 37 which interrupts the prevailing holding circuit through the holding coil 25 in the blocking relay RI whereby the blocking relay is deenergized. If the testing relay RII also is energized this relay will be deenergized by opening of the make contacts 33 and 34 in the blocking relay RI.

Although a blocking means which blocks the adding machine to further operating cycles is preferable as a means for indicating caluculation errors discovered by zero control, the electromagnet 35 and the pawl 36 may if desired be replaced by some other electrically operated error indicating means, for example a lamp which is supplied with current through the make contact 31 and the signal of which remains after release of the key 30 and indicates the discovered error to the operator.

What I claim and desire to secure by Letters Patent is:

1. Apparatus for performing zero control in adding machines having a balancing register with carry transmitting means operating according to the principle of the "fugitive one" and being adjustable between an inoperative position and an operative position, comprising a blocking relay, switch means actuatable after a calculation the result of which shall be zero as registered by the balancing register, for energizing said blocking relay, a first make contact of said blocking relay, an error signalling means energizable by closing said first make contact, a testing relay, a break contact in said testing relay, a second make contact in said blocking relay, a first holding circuit for said blocking relay including said break contact of said testing relay and said second make contact of said blocking relay, a testing switch operable by means of the carry transmitting means of the highest order of the balancing register to be closed in the inoperative position and open in the operative position of the carry transmitting means of the highest order of the balancing register, a third make contact of said blocking relay, a second holding circuit for said blocking relay including said testing switch and said third make contact of said blocking relay, an energizing circuit for said testing relay operable by means of said blocking relay, electromagnetic means operable when energized to adjust the carry transmitting means of the lowest order of the balancing register from the inoperative position to the operative position, and a make contact of said testing relay for energizing said electromagnetic means.

2. Apparatus according to claim 1, in which said energizing circuit for said testing relay includes said third make contact of said blocking relay.

3. Apparatus according to claim 1, comprising two control coils of said blocking relay, one of said control coils, the energizing coil, being connected to said switch means for energizing said blocking relay, and the other control coil, the holding coil, being connected to said first and second holding circuit for holding said blocking relay energized when one of said holding circuits is closed.

4. Apparatus according to claim 3, in which said switch means is a make-and-break contact having a fixed contact connected to said energization coil of said blocking relay and another fixed contact connected to said third make contact of said blocking relay.

5. Apparatus according to claim 1, comprising a further make contact of said testing relay, a fourth make contact of said blocking relay, and a holding circuit for said testing relay, including said further make contact of said testing relay and said fourth make contact of said blocking relay.

6. Method of performing zero control in adding machines having a balancing register with carry transmitting means operating according to the principle of the "fugitive one" and being adjustable between an inoperative position and an operative position, comprising the steps of testing the position of the carry transmitting means of the highest order of the balancing register, activating an error signal when the carry transmitting means of the highest order of the balancing register occupies the operative position during said testing, and making, when the carry transmitting means of the highest order of the balancing register occupies the inoperative position during said testing, a release movement of the carry transmitting means of the lowest order of the balance ing register in order to induce the carry transmitting means of the lowest order of the balancing register to move to operative position, if it does not already occupy such operative position, and activating said error signal when the carry transmitting means of the highest order of the balancing register still occupies its inoperative position after said making of a release movement of the carry transmitting means of the lowest order of the balancing register.

References Cited by the Examiner

UNITED STATES PATENTS

| | | | |
|---|---|---|---|
| 1,624,105 | 4/1927 | Landsiedel | 235—60 X |
| 1,949,706 | 3/1934 | Barrett | 235—60.17 |
| 2,987,244 | 6/1961 | Schulz | 235—60.17 |
| 2,987,245 | 6/1961 | Knox et al. | 235—60.17 |
| 3,049,293 | 8/1962 | Garvey et al. | 235—130 |

LOUIS J. CAPOZI, *Primary Examiner.*

LEO SMILOW, *Examiner.*